United States Patent [19]

Cromie

[11] 4,084,758
[45] Apr. 18, 1978

[54] MACHINE HAVING AN IMPROVED TAKE-UP REEL FOR WINDING HOLLOW FILAMENTS

[75] Inventor: Harry W. Cromie, Pittsburgh, Pa.

[73] Assignee: Baxter Travenol Laboratories, Inc., Deerfield, Ill.

[21] Appl. No.: 658,142

[22] Filed: Feb. 13, 1976

[51] Int. Cl.$^2$ ...................... B65H 54/56; B65H 49/30
[52] U.S. Cl. ................................ 242/18 G; 242/68.3; 242/127
[58] Field of Search ...................... 242/68.3, 68, 68.1, 242/127, 18 R, 18 G

[56] References Cited

U.S. PATENT DOCUMENTS

| | | | |
|---|---|---|---|
| 1,282,529 | 10/1918 | Blease et al. | 242/127 X |
| 1,310,741 | 7/1919 | Cook | 242/127 X |
| 1,567,138 | 12/1925 | Hartman et al. | 242/127 |
| 2,928,620 | 3/1960 | Stavrakis et al. | 242/68.3 |
| 3,198,454 | 8/1965 | Gorsek, Jr. et al. | 242/68.3 |
| 3,233,841 | 2/1966 | Neff | 242/68.3 |
| 3,565,360 | 2/1971 | Ura | 242/68.3 |
| 3,712,561 | 1/1973 | Williams | 242/68.3 |
| 3,801,033 | 4/1974 | Sanderson | 242/68.3 |

Primary Examiner—John Petrakes
Attorney, Agent, or Firm—Gerald S. Geren; Paul C. Flattery

[57] ABSTRACT

There is disclosed herein an apparatus and method for preparing a continuous, hollow, and semipermeable filament for use in a dialyzer which includes a plurality of substantially-equal-length open-ended fibers.

The apparatus includes a body having a supply spool of filament and a take-up reel having at least two radially-spaced support means about which the filament is wound. Drive means rotate the take-up reel and a filament guide is provided for laterally positioning the filament on the support member so as to prevent close packing of the filament windings. The take-up reel includes a winding plate for carrying the filament support means and hub-and-locking means for releasably mounting the winding plate on the machine.

The method includes winding the filament from the spool onto the take-up reel; grasping each of the sections of filament between the support means; and cutting the filament adjacent the support means so as to form a plurality of bundles of open-ended fibers for use in a hollow fiber dialyzer.

5 Claims, 11 Drawing Figures

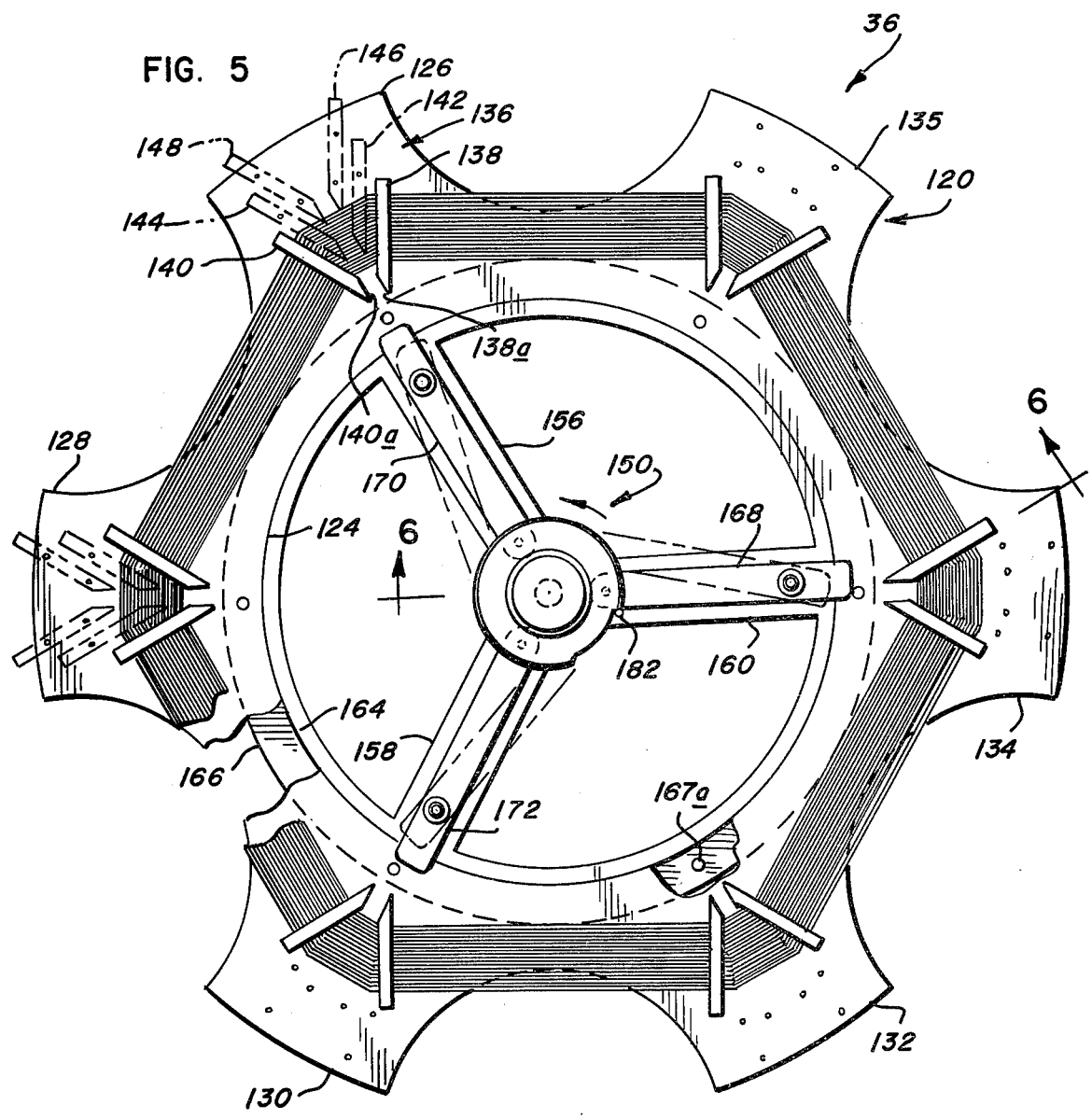
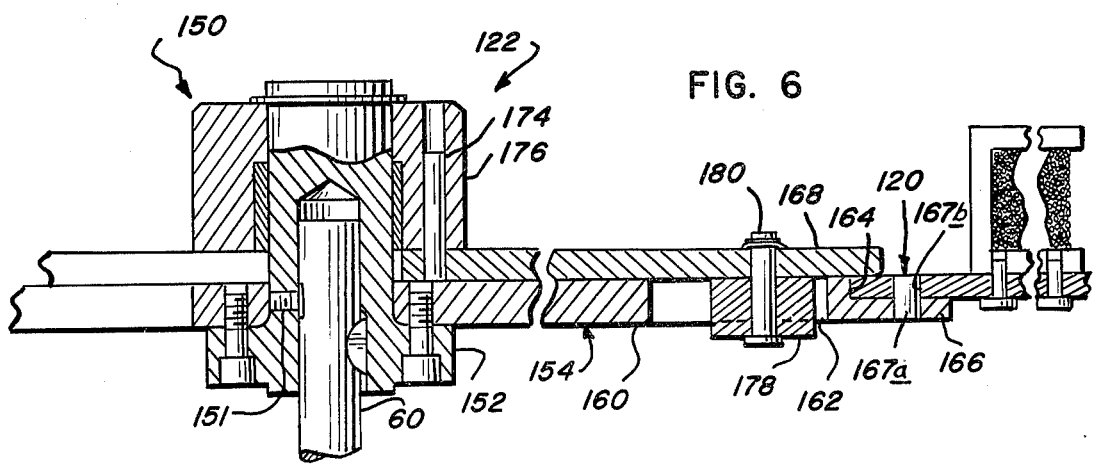

MACHINE HAVING AN IMPROVED TAKE-UP REEL FOR WINDING HOLLOW FILAMENTS

BACKGROUND OF THE INVENTION

This invention relates to a machine used in the manufacture of hollow fiber dialyzers of the type used in artificial kidney systems.

Artificial kidney systems include dialyzers or membrane diffusion devices through which blood from a patient flows for treatment. One type of dialyzer is known as a hollow-fiber dialyzer.

A hollow-fiber dialyzer includes an elongated, and generally-cylindrically-shaped casing within which many very-fine, hollow and semipermeable fibers are positioned and secured adjacent their terminal ends to the casing. Blood from the patient flows through the dialyzer inside the fibers. Dialysis solution flows through the dialyzer and surrounds and contacts the fibers so as to receive bodily waste products from the blood and remove them from the dialyzer.

The fibers are made from a long hollow filament of cellophane or of a cellulose derivative, such as sold under the trade name Cuprophan. The filament is continuous and is supplied on a spool.

In manufacturing the dialyzer it is impractical to individually cut the filament into individual fibers, group or bunch the fibers, and then assemble the dialyzer. One suggested process for bunching the fibers is to form the filament into a hank by winding the filament on a wheel, grasping the wound filaments at two points and removing the hank from the wheel. The hank is then pulled into a cylindrical casing. In this form the filament is still continuous and after further preparation the looped ends of the hank are cut so as to form the openended fibers. As can be appreciated, only one device can be made from each hank.

It is therefore an object of this invention to provide a method and apparatus for use in preparing the fiber bundles which is suitable for use in the mass production of hollow fiber dialyzers.

In other winding systems the filament is wound on a support which support ultimately becomes part of the device. Unfortunately, in the dialyzer the support is an inactive element which occupies space and thereby reduces the efficiency of the device.

It is thus another object to provide a winding machine wherein the winding support does not become a part of the dialyzer.

This and other objects of this invention will become apparent from the following description and appended claims.

SUMMARY OF THE INVENTION

There is provided by virtue of this invention method and apparatus for winding a filament so as to prepare a plurality of fiber bundles for use in manufacturing hollow fiber dialyzers.

The machine includes: a base; at least one supply spool of continuous filament; and a take-up reel having a plurality of radially-spaced supports about which the filament is wound and between which the filament can be bundled. A movable filament guide is provided which is positioned between the supply spool and take-up reel for continuously controlling the lateral positioning of the filament in a manner such as to assure a loose winding of the filament so that an upper winding of the filament crosses over a lower winding. This loose packing and crossover assures effective flow of dialysis solution within the dialyzer and maximizes the efficiency thereof. The guide moves or oscillates in a lateral or axial direction with respect to the take-up reel and at a rate related to the rotation of the take-up reel so as to assure proper crossover.

BRIEF DESCRIPTION OF THE DRAWINGS

FIG. 5 is a side elevational view showing the take-up reel;

FIG. 6 is a sectional view taken substantially along line 6—6 of FIG. 5 and showing a hub-and-locking mechanism for the take-up reel;

DESCRIPTION OF THE PREFERRED EMBODIMENT

General

Figure 1:
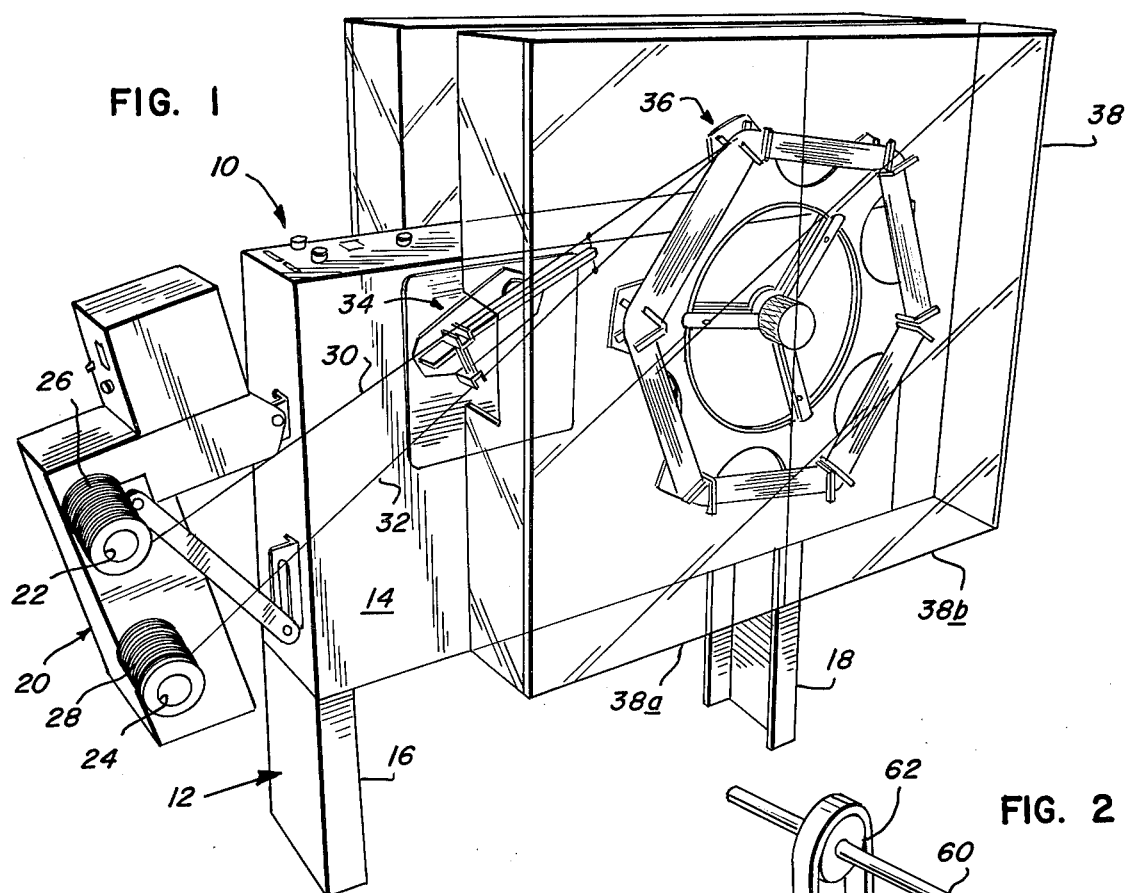
FIG. 1 is a perspective view of one side of the winding machine showing the take-up reel, two filament supply spools and the filament guide.
Figure 2:
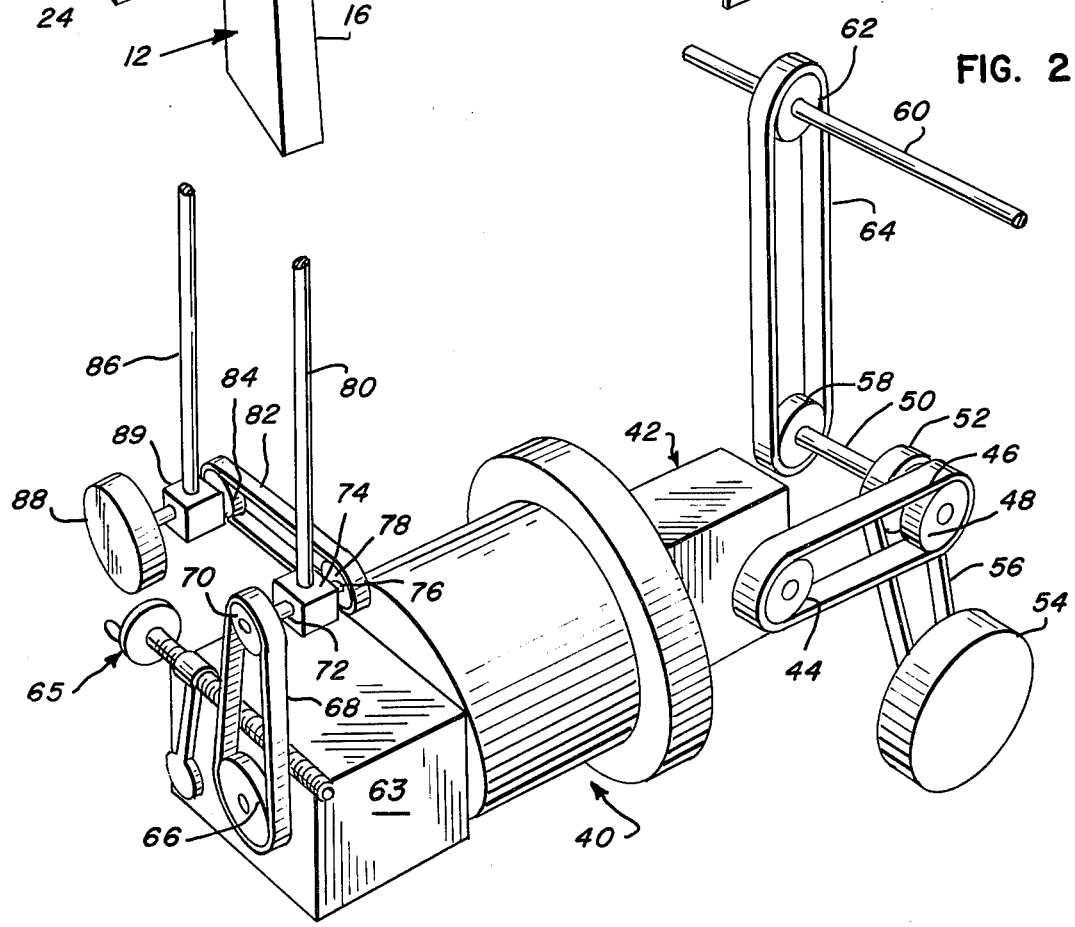
FIG. 2 is a diagrammatic and perspective view of a drive system for driving the take-up reel and for moving the filament guide.

Referring now to FIG. 1, the winding machine 10 includes a body 12 on each side of which is provided a winding mechanism. The body includes a boxlike main section 14, which is supported by a pair of legs 16 and 18. A control console and supply spool mounting section 20 is supported in a cantilever fashion from the back end of the main body section 14.

Two substantially identical winding mechanisms are provided, one on each side of the body. Thus, two winding operations can be performed simultaneously, if desired.

Each winding mechanism includes upper and lower spool support shafts 22 and 24, which extend laterally from the mounting section 20. Two filament supply spools 26 and 28, each having wound thereon a continuous hollow filament, are mounted on the shafts 22 and 24. The filaments 30 and 32 extend from the spools through the filament guide assembly 34 and to the driven take-up reel assembly 36. A protective and transparent case, such as 38, having two access doors 38a and 38b is carried by the main body section so as to enclose the guide assembly and take-up reel.

Drive System

The rotation of the take-up reel assembly 36 and movement of the filament guide assembly 34 are controlled by a drive system, which is enclosed with the main body section 14. The system includes an electric motor 40, which drives both the reel assembly and the guide assembly. The motor speed can be varied between 0–2000 rpm.

The Reel Drive

The motor 40 is connected to the take-up reel through a gear and timing belt system as described hereinafter. The motor 40 is connected to a 5:1, worm-gear-type speed reducer 42 having an output gear 44. A geared output drive timing belt 46 is trained about the gear 44, as well as the driven gear 48, which is mounted on the cross-shaft 50. A counter, take-off gear 52 is mounted on the cross-shaft 50 and is connected to a rpm counter 54 by a counter timing belt 56. The gearing system is arranged such that the counter is synchronized with the take-up reel assembly so as to indicate the take-up reel rpm.

A reel drive gear 58 is also mounted to the shaft 50 and is connected to a reel drive shaft 60 by a gear 62 on the shaft 60 and a timing belt 64. The take-up reel assembly 36 is mounted to an end of the shaft 60. Thus the take-up reel is driven: by the motor 40; through the gear reducer 42; through the gear 44, belt 46 and gear 48; through shaft 50; through gear 58, belt 64 and gear 62; and through shaft 60. Through this system the take-up reel can be driven at between 0–400 rpm.

The Guide Drive

The guide assembly 34 is mounted so as to cause the filament to reciprocate or move laterally with respect to the take-up reel assembly 36 at a rate related to the rotation of the take-up reel. The motor 40 drives the guide assembly. A variable speed control 63 is mounted to the motor 40. The speed control includes a manual speed adjuster 65 and an output gear 66. The speed of the output gear 66 is controllable between 0–400 rpm. A drive timing belt 68 is trained about the output gear 66 and a smaller driven gear 70. For each revolution of the output gear 66, the driven gear 70 revolves 2.25 times, so as to provide a 2.25:1 gear ratio. The driven gear 70 is secured to one end of a shaft 72, which enters a gear box 74. A second aligned shaft 76 exits the gear box and a gear 78 is secured to the outer end of the shaft 76. A rotatable cam drive shaft 80 extends upwardly from the gear box and is driven by the shaft 72. A bevel gear arrangement (not shown) is provided within the gear box for driving the shafts 76 and 80.

Another timing belt 82 is trained about the gear 78 and a gear 84 for driving a second rotatable cam drive shaft 86 and a counter 88, through a gear box arrangement 89, which is similar to that previously described in connection with the gear box 74. The counter 88 is synchronized with the rotation of the shafts 80 and 86, which, in turn, is related to the rate of reciprocation of the guide arm, so that the counter indicates the rate of guide arm reciprocation or oscillation.

Figure 3:
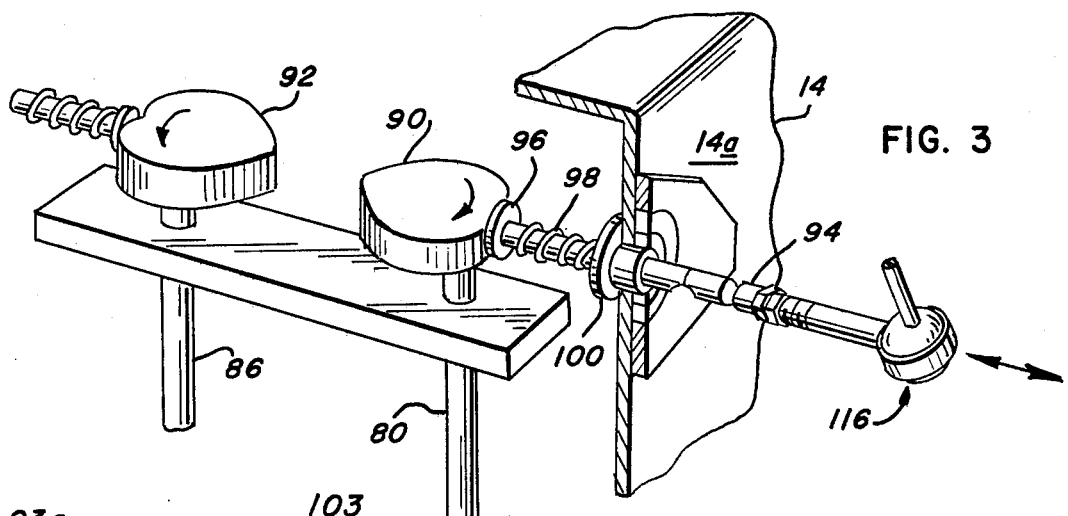
FIG. 3 is a perspective view, partially in section, showing a two-cam system for controlling the movement of the filament guides on each side of the machine.

Referring now to FIG. 3, each of the shafts 80 and 86 carry at their upper end a cam, such as 90 and 92, which controls the reciprocation of the guide assembly 34 and the filaments. A reciprocating control rod 94 extends from within the body 14 through a sidewall 14a and connects at its outer end to the guide assembly 34. At the inner end, the rod 94 includes a cam follower 96, which is biased against the cam 90 by a coiled compression spring 98 that bears against a bearing plate 100 and the cam follower 96. Rotation of the cam 90 causes the rod 94 to reciprocate. It will be appreciated that the guide arm on the other side of the machine (not shown) is controlled in a similar manner.

With this arrangement the rate of reciprocation of the guide arm can be controlled between 0–900 oscillations per minute.

Figure 3A:
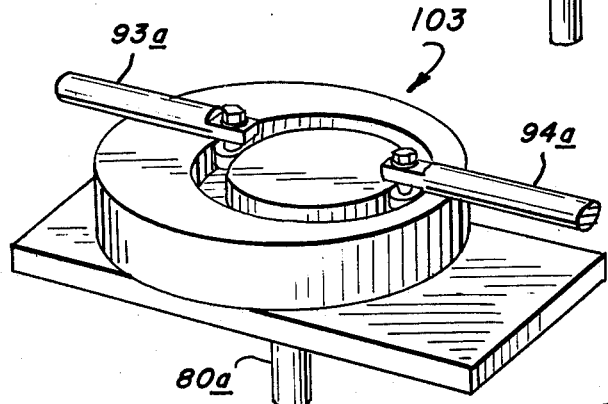
FIG. 3A shows an alternative single cam system for controlling the guides.
Figure 4:
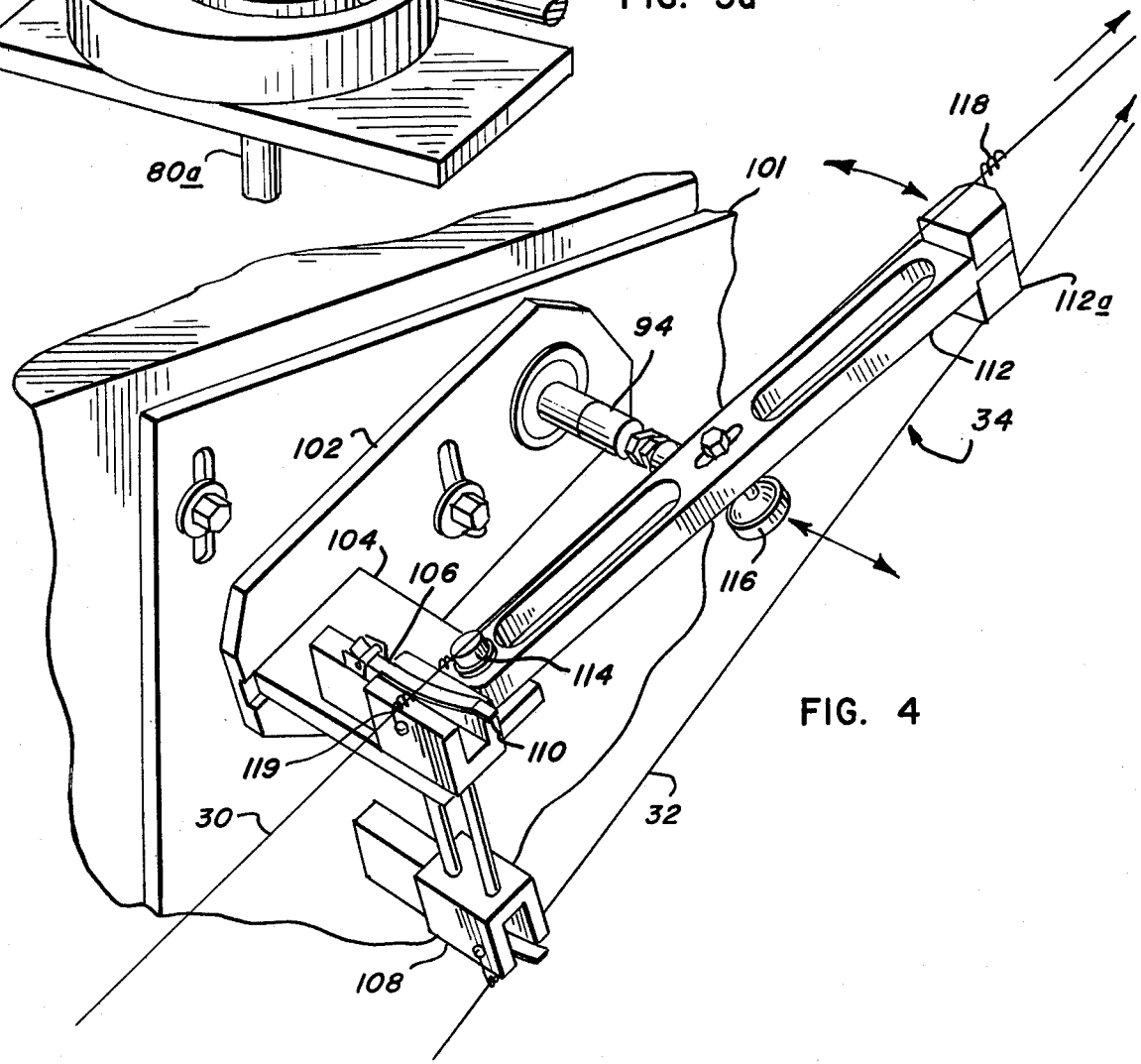
FIG. 4 is an enlarged perspective view showing a filament guide assembly.

In the alternative cam construction shown in FIG. 3A, there is a single grooved cam 103. Here there is only one drive shaft 80a which drives the single cam, which, in turn, controls the two control rods 93a and 94a.

It will be appreciated that the speed of the cam drive shaft 80 relative to the take-up reel drive shaft 60 can be controlled and adjusted with the speed control adjuster 65. If no adjustment is made, the ratio of guide arm reciprocation to take-up reel rotation remains constant regardless of the speed of the take-up reel. However, use of the adjuster 65 permits adjustment and control of the ratio of guide arm reciprocation to take-up reel rotation.

Guide Arm Assembly

The guide arm assembly 34 is mounted to the outside of sidewall 14a by a vertically adjustable mounting plate 101, a pivotally adjustable side plate 102 and a forwardly and rearwardly adjustable lateral support plate 104. An upper filament sensing switch 106 is mounted to the top side of the plate 104 and a lower filament sensing switch 108 is supported by and is positioned below the plate 104. Each switch includes leaf-like member, such as 110, which is biased toward the filament and which engages and senses the presence of the filament, such as 30. In the event the filament breaks during winding, the member 110 moves upwardly and actuates means (not shown) for disabling the drive system and for applying a controlled braking action to the supply spool shafts and the take-up reel to minimize breakage of filaments on other reels.

An elongated and swingable guide arm 112 is pivotally mounted at its back end to the support plate 104, forwardly of the switch 106, by a pin 114. The control rod 94 is connected to the arm at a point intermediate the ends of the arm by a universal-type joint 116. The head 112a at the forward end of the guide arm carries upper and lower spring-like filament guides, such as 118, which cooperates with the spring-like filament guides, such as 119, associated with the switches. As the control rod reciprocates, the head 112a swings back and forth in a manner controlled by the cam 90.

The Take-Up Reel Assembly

The take-up reel assembly 36, as shown in FIGS. 5 and 6, includes a filament winding plate 120 and a hub-and-locking system 122 for removably securing the plate to the machine.

The Winding Plate

The plate 120 has a large, circular and centrally positioned opening which defines the inner edge 124, and has six support edge carrying sections 126, 128, 130, 132, 134 and 135. Each of the sections are positioned radially outwardly from the center of the plate and equally about the periphery.

A V-shaped filament support assembly, such as 136, is mounted on the plate at each of the support sections, such as 126. Each of the support assemblies, such as 136, includes a pair of outwardly extending U-shaped filament supports 138 and 140, each of which terminates in a lower beveled edge, such as 138a and 140a. Each of the supports, such as 138 and 140, is bolted to the plate through bolt-receiving apertures in the plate 120. As can be seen in FIG. 5, the filament support assemblies can be movably positioned in one of three different radial positions. Thus the supports 138 and 140 can be moved from the inner position as shown to an intermediate position at 142 and 144, or to an outer position at 146 and 148.

It will be appreciated that such changes in position can increase or decrease the length of the filament bundles between the sets of supports. For example, by moving the supports radially outwardly, the length of the bundles between the adjacent supports is lengthened. This permits the manufacture of hollow fiber dialyzers of different lengths.

The Hub-and-Locking System

The system 122 for securing the plate 120 to the machine is shown in both FIGS. 5 and 6. That system includes a hub assembly 150, which is secured to an end of the winding shaft 60 by a set screw 151. The hub assembly includes a flanged, boss-like member 152 to which a wheel-like support plate 154 is secured. The support plate includes three radial spokes 156, 158 and 160, each of which has an elongated guide slot, such as 162. The outer periphery of the support plate is L-shaped in section and defines an axial or laterally-extending shoulder 164 and a circumferential shoulder 166.

The take-up reel winding plate 120 is constructed such that the inner edge 124 can be fitted onto the shoulder 164 with the plate 120 against the circumferential shoulder 166. This fit prevents radial movement of the winding plate 120 relative to the hub 150. The plate 120 is removably secured in driving relation to the hub assembly by six studs, such as 167a, which extend outwardly from the shoulder 166 and which engage six stud-receiving apertures, such as 167b, in the winding plate.

Three generally radially-extending locking arms 168, 170 and 172 are provided to secure the winding plate 120 to the support plate 154 by preventing axial movement of the winding plate with respect to the support plate shoulder 166. The arms are secured at their inner ends to the hub 150 by a pin, such as 174, and a pivotable collar-like member 176. Each arm carries a guide block, such as 178, which moves radially within the slot 162 in the arm. The guide block 178 is secured to the arm and in the slot by a pin 180. Each of the locking arms is of a length such that when the arms are in the extended, radial and locking position, the outer end of the arm is positioned radially outwardly over the shoulder 164 and in overlying relationship to the plate 120. With this construction the arm can lock and hold the winding plate 120 on the winding machine in fixed relation to the shaft 60.

The collar 176 is rotatable with respect to the shaft 60 and to the support arms, such as 160. As can be seen in FIG. 5, a stop pin 182 defines the limits of movement for the collar 176. The collar is held in the locked position by a spring-loaded detent assembly (not shown). In the position shown in FIG. 5, in full line, the arms are positioned to lock the plate in position. Rotation of the collar 176 causes the arms to retract and the guide members, such as 178, slide within the slots 162, until the outer ends of the arms move within the inner edge of the shoulder 164. With the locking arms retracted, the winding plate 120 can be removed from the machine by pulling it axially outwardly.

Operation of the Winding Machine

Figure 8:
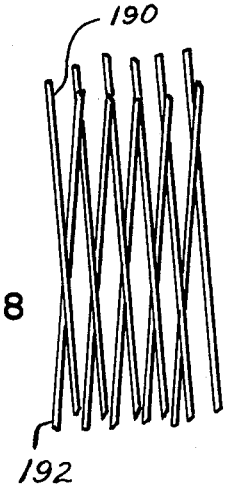
FIG. 8 is a view taken substantially along line 8—8 of FIG. 7 and showing the filament crossover.

As can be seen from the drawings, the two spools of hollow-fiber filaments are mounted on the shafts 22 and 24 and each filament is guided through the guide assembly 34 and started on the take-up reel 36. The machine is actuated so that the motor rotates the take-up reel assembly 36. As this occurs, the take-up reel draws filament from the supply reel through the guide assembly. The action of the cams, such as 90, causes the guide arm 112 to oscillate or move laterally, inwardly and outwardly as the take-up reel rotates. The cam is designed in a manner such as to provide an even distribution of the filament on the guides. The shape of the cam cooperates in preventing build-up of filament at the edges of the guide by increasing the arm speed at each end of the oscillation. Furthermore, the cam prevents close-packing of the filament windings and causes the filament which is being wound to crossover the previous winding of the filament. This crossover is diagrammatically shown in FIG. 8 where it can be seen that an upper filament winding 190 crosses over a lower filament winding 192.

It has also been found that the use of the two reels is beneficial from the point of view that a sufficient quantity of filament is supplied so as to continuously feed the take-up reel and thereby avoid the need to stop the winding operation and start a second spool. This stopping has been found to be detrimental to the efficiency of the dialyzer since undesirably large flow channels may be formed where on spool ended and the other began. It is believed that the channel may be formed as a result of differences in filament tension at the end of the first spool and at the beginning of the second spool.

During winding it has been found to be desirable to rotate the take-up reel at a speed greater than the speed at which the guide arm oscillates. In one particular operation the take-up reel is driven at 200 rpm and the guide arm is oscillated at 160 oscillations per minute.

It will be appreciated that as the geometry of the take-up reel, for example the size and diameter of the take-up reel, changes that the oscillations of the guide arm must also change in order to effectuate proper crossover.

Once the filaments are wound on the take-up reel and the bundles are of a sufficient size for use in hollow fiber dialyzers, the winding operation is stopped.

Preparation of Fiber Bundles

Figure 9:
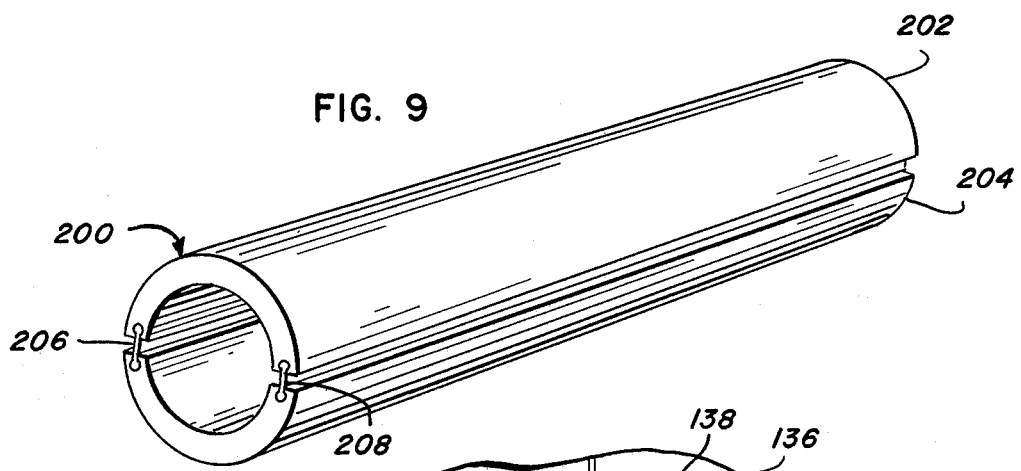
FIG. 9 is a perspective view showing a split sleeve for use in bundling the filament for cutting into the fibers.
Figure 10:
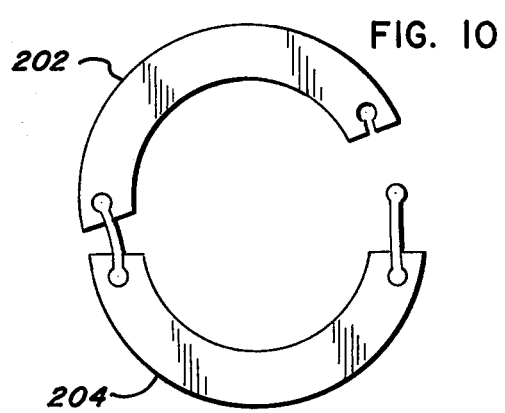
FIG. 10 is an end view of the split sleeve with one side opened.

An elongated split case 200 as shown in FIG. 9 is used in forming the fiber bundles from the filaments and for removing the bundles from the take-up reel. The split case includes an upper semi-cylindrical member 202 and a lower cylindrical member 204, which are joined by a pair of flexible hinges 206 and 208. As can be seen in FIG. 10, the sections can be opened and positioned and clamped about the wound bundles of the filament.

Figure 7:
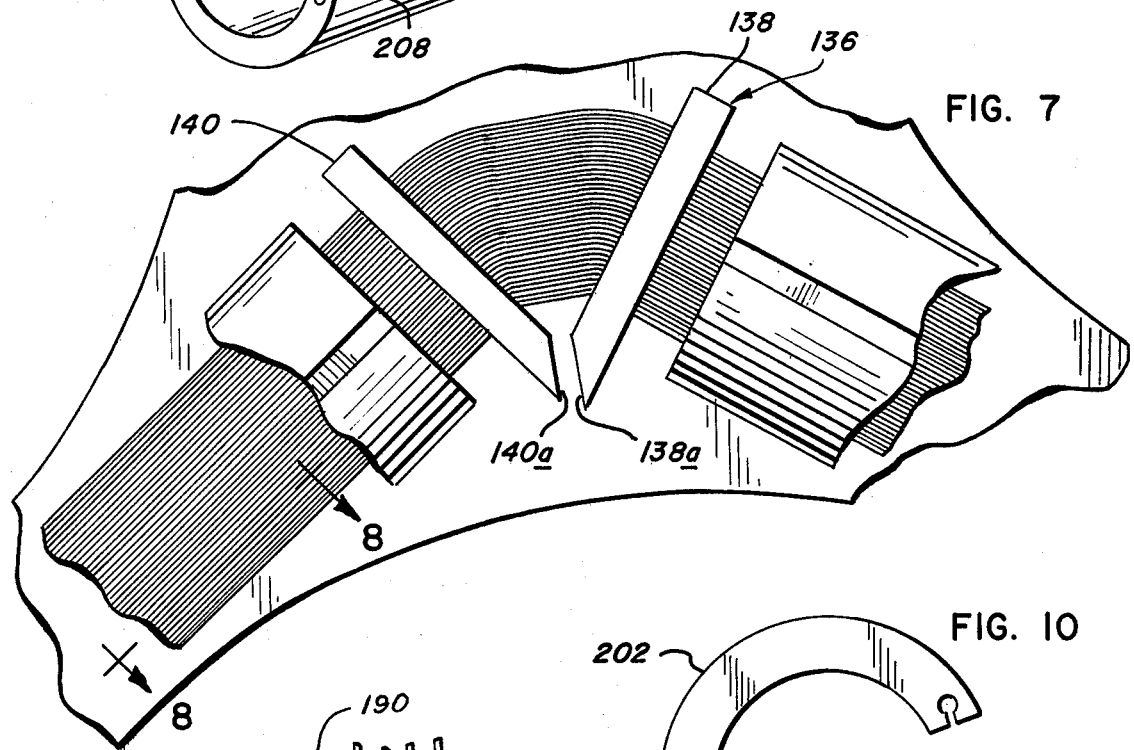
FIG. 7 is a greatly enlarged elevational view showing a portion of the take-up reel.

Referring now to FIG. 7, once the members are in position, they tightly grasp the bundles of filament therebetween and the filament may then be cut at either end of the case so as to form open-ended fibers and permit removal of the bundles from the reel. The cutting converts the continuous filament to the individual hollow fibers used in the dialyzer. After cutting and removal, the individual bundles are then treated and formed into the hollow fiber dialyzers.

It will be appreciated that numerous changes and modifications can be made in the embodiments disclosed herein without departing from the spirit and scope of this invention.

What is claimed is:

1. A machine for preparing a continuous, hollow, and semipermeable filament for use in a hollow fiber dialyzer, which dialyzer includes a plurality of substantially-equal-length openended fibers formed from said filament, said machine including:
   (a) a body;
      at least one supply spool of said filament, said spool being rotatably mounted on said body;
   (b) a take-up reel having at least two radially spaced support means about which said filament is wound, said reel being rotatably mounted on said body; and
   (c) drive means for rotating said take-up reel; wherein the improvement comprises said take-up reel, including:
   (d) a hub member having locking means drivingly associated with said drive means;
   (e) winding plate means for carrying said filament support means being adapted for releasable securement in driving relation to said hub member; and
   (f) said support means cooperating with said winding plate means for supporting said bundles in a substantially exposed disposition to facilitate cutting of said bundles upon completion of winding on said take-up reel.

2. A machine for preparing a continuous, hollow, and semipermeable filament for use in a hollow fiber dialyzer, which dialyzer includes a plurality of substantially-equal-length open-ended fibers formed from said filament, said machine including:
   (a) a body;
      at least one supply spool of said filament, said spool being rotatably mounted on said body;
   (b) a take-up reel having at least two radially spaced support means about which said filament is wound, said reel being rotatably mounted on said body; and
   (c) drive means for rotating said take-up reel; wherein the improvement comprises said take-up reel, including:
   (d) a hub member having locking means drivingly associated with said drive means; and
   (e) winding plate means for carrying said filament support means being adapted for releasable securement in driving relation to said hub member;
   (f) said support means being constructed to receive said filament and group of filaments between adjacent support means into a single bundle, said support means further being radially movable so as to permit adjustment of the length of the filament bundle between adjacent support means; and
   (g) said hub member including radial slots dimensioned to receive guide members for relative radial movement therein, said locking means including locking arms secured to said guide blocks for reversably moving said locking arms from a retracted position to an extended position to lock said winding plate means onto said hub member.

3. The machine according to claim 1 wherein said winding plate includes a large, central-mounting aperture; said hub member includes a peripheral shoulder means for mating cooperation with said mounting aperture; and said locking means includes central, pivotal-collar means associated with said arm means for moving said arm means between the retracted and the extended position.

4. The machine according to claim 3 wherein said locking means includes:
   (a) said locking arm being pivotably secured at one end to said guide member and pivotably secured at said other end to said pivotal collar means at a position displaced from the axis of said collar means such that rotation of said collar means causes said locking arm to move radially as defined by the path of said slots in said take-up reel and to be displaced about the axis of said collar means to effect moving of the locking arm between extended position to the retracted position.

5. The machine according to claim 4 wherein said winding plate means is releasably secured to said hub member to prevent relative rotational movement.

* * * * *